United States Patent [19]
Rich

[11] Patent Number: 5,284,556
[45] Date of Patent: Feb. 8, 1994

[54] EXHAUST TREATMENT SYSTEM AND METHOD

[75] Inventor: Stanley R. Rich, Grantham, N.H.

[73] Assignee: PlasMachines, Inc., Natick, Mass.

[21] Appl. No.: 694,090

[22] Filed: May 1, 1991

[51] Int. Cl.$^5$ .......................... B01J 19/08; H05F 3/04
[52] U.S. Cl. .................................. 204/164; 204/179; 422/186.21; 422/186.3
[58] Field of Search ...................... 204/164, 179, 170; 60/275; 422/186.21, 186.3

[56] References Cited

U.S. PATENT DOCUMENTS

| | | | |
|---|---|---|---|
| 832,767 | 10/1906 | Bridge | 704/176 |
| 2,195,431 | 4/1940 | Shively et al. | 204/31 |
| 3,091,920 | 6/1963 | Matvay | 60/30 |
| 3,157,479 | 11/1964 | Boles | 55/146 |
| 3,188,167 | 6/1965 | Specht | 423/212 |
| 3,450,617 | 6/1969 | Hellund | 204/164 |
| 3,526,081 | 9/1970 | Kusters | 55/127 |
| 3,545,917 | 12/1970 | Stephens | 23/2 |
| 3,620,008 | 11/1971 | Newbold | 60/30 |
| 3,653,185 | 4/1972 | Scott et al. | 55/103 |
| 3,671,417 | 6/1972 | Louboutin | 204/320 |
| 3,674,666 | 7/1972 | Foster et al. | 204/164 |
| 3,706,182 | 12/1972 | Sargent | 55/124 |
| 3,846,637 | 11/1974 | Gettinger | 204/164 |
| 3,862,043 | 1/1975 | Haakenson | 250/527 |
| 3,875,034 | 4/1975 | Adams et al. | 204/165 |
| 3,898,468 | 8/1975 | Guerin | 250/535 |
| 3,942,020 | 3/1976 | Clambrone | 250/539 |
| 3,979,193 | 9/1976 | Sikich | 204/176 |
| 3,983,021 | 9/1976 | Henis | 204/164 |
| 4,098,578 | 7/1978 | Stanton | 23/277 |
| 4,221,768 | 9/1980 | Inoue et al. | 423/239 |
| 4,256,711 | 3/1981 | Sermon | 423/239 |
| 4,362,016 | 12/1982 | Papadopulos | 60/297 |
| 4,441,971 | 4/1984 | Ishiguro et al. | 204/164 |
| 4,507,266 | 3/1985 | Satoh et al. | 422/186.15 |
| 4,587,807 | 5/1986 | Suzuki | 60/274 |
| 4,657,738 | 4/1987 | Kanter et al. | 422/186.04 |
| 4,876,852 | 10/1989 | Abthoff et al. | 60/275 |
| 4,980,040 | 12/1990 | Lichtin et al. | 204/157.46 |
| 5,147,516 | 9/1992 | Mathur | 204/177 |

FOREIGN PATENT DOCUMENTS

| | | |
|---|---|---|
| 2802194 | 7/1978 | Fed. Rep. of Germany . |
| 3642472A1 | 12/1986 | Fed. Rep. of Germany . |
| 3644090A1 | 12/1986 | Fed. Rep. of Germany . |
| 50-10275 | 5/1973 | Japan . |
| 199633 | 4/1989 | Japan . |

OTHER PUBLICATIONS

C. R. McLarnon and V. K. Mathur, Corona-Catalytic Reduction of Nitrogen Oxides Jan. 1991, pp. 1-18 and abstract.

"Considerable Change in DC Breakdown Characteristics of Positive-Point-Plane Gaps Due to Varying Concentrations of $NO_x$, $CO_2$ and $H_2O$ in Air and Intensity of Irradiation"—by Y. Gosha—Jun. 29, 1981—Department of Electronic Engineering, Tokushima University, Tokushima, Japan.

"Decomposition of Nitric Oxide in a Silent Discharge'"—by Larry A. Haas, Carl F. Anderson, and Sanaa E. Khalafalla Published 1978 by the American Chemical Society.

"IGR Solid-State Electrochemical $NO_x$ Control for Natural Combustion Exhaust Gases"—by M. S. Hossain, M. Neyman, W. J. Cook (Helipump Corporation) and A. Z. Gordon (IGR Enterprises)—Presented at the (List continued on next page.)

Primary Examiner—John Niebling
Assistant Examiner—Brian M. Bolam
Attorney, Agent, or Firm—Alan R. Loudermilk

[57] ABSTRACT

A moving fluid containing pollutants including NOx compounds is subjected to a relatively low-power alternating-current dielectric discharge for a relatively long time duration. In this manner, pollutants are oxidized and dissociated while the temperature of the fluid is kept low enough to prevent the formation of new NOx pollutants.

70 Claims, 1 Drawing Sheet

OTHER PUBLICATIONS

Energy Sourceds Technology Conference and Exhibition—New Orleans, Louisiana—Jan. 10-14, 1988.
"Removal of $NO_X$ By Corona Discharge Induced by Sharp Rising Nanosecond Pulse Voltage—by S. Masuda and Y. Wu"—Department of Electrical Engineering, The University of Tokyo; Department of Physics, Northeast Normal University, Chang Chun, China.

Decomposition of Hydrogen Sulfide in an Electrical Discharge by L. A. Haas and S. E. Khalafalla—Twin Cities Metallurgy Research Center—Report of Investigation 7790.
Optimizing Decomposition of Carbonyl sulfide in an Electrical Discharge by Larry A. Haas, Carl F. Anderson, and Saman E. Khalafalla . . . Twin Cities Metallurgy Research Center . . . Report of Investigation 7698.

EXHAUST TREATMENT SYSTEM AND METHOD

FIELD OF THE INVENTION

This invention relates to apparatus and method for reducing polluting substances such as NOx, hydrocarbons and carbon monoxide emissions in a fluid such as an exhaust gas or stack gas.

BACKGROUND OF THE INVENTION

Polluting agents in exhaust gases generated by internal combustion engines and in stack gases generated by power plants burning fossil fuels have seriously degraded air quality in many locations and created acid rain, smog and a host of other environmental problems. Two pollution components commonly found in exhaust and stack gases are nitrogen compounds such as nitric oxide and nitrogen dioxide (collectively called NOx), carbon monoxide and various hydrocarbon compounds which result from incomplete or imperfect combustion of the fossil fuels. Although these components are known to cause pollution problems, recent attention has focussed on NOx compounds which are in part responsible for acid rain. Attempts to control, reduce or eliminate the pollutants in exhaust gases have included mechanical, electrical and chemical apparatus.

One known method of reducing pollutants is by means of chemical apparatus such as catalytic converters. Such devices are typically used with internal combustion engines such as those found in automobiles. In a catalytic converter system, engine exhaust gasses are mixed with air and the mixture then passes through a catalyst bed. In the catalyst bed, pollutants in the exhaust gas react with the air in the mixture to produce more complete combustion. Such devices have drawbacks. For example, they restrict the exhaust gas flow and therefore increase the exhaust back-pressure on the internal combustion engine, resulting in reduced efficiency and fuel economy. Further, the catalyst must be replaced at regular intervals to maintain conversion efficiency, thus increasing maintenance expense. In addition, such catalytic converters are not known to efficiently reduce NOx pollutants. Consequently, additional techniques are generally used in conjunction with the converter systems to reduce NOx pollutants. These additional techniques generally take the form of recirculating a portion of the engine exhaust gases through the engine to reduce combustion temperatures. However, these additional techniques further reduce fuel efficiency and economy and require additional equipment.

Other proposals to reduce pollution to a satisfactory level have involved the application of electric fields to the pollutant-containing exhaust gas. Such proposals involve mixing air with the exhaust gases, and then subjecting the mixture to an electric field which may take the form of a spark, an electric arc, electric plasma, a corona or a silent discharge. The electric field must be sufficiently intense and of sufficient duration to create ozone within the exhaust gas which then reacts with the pollutants to dissociate the compounds or to form harmless compounds. Two attempts to use electrical discharge to reduce pollutants are shown in U.S. Pat. Nos. 3,188,167 and 3,979,193.

Previously known electrical devices appear to have additional drawbacks. First, because of the intense electric field used in such devices, oxidation of nitrogen may actually increase the amount of NOx pollutants. Second, due to their construction, such devices typically increase exhaust back pressure, thereby reducing fuel economy and efficiency. Moreover, the addition of secondary air requires an air compressor, and this is a disadvantage because of the additional energy consumed.

It is an object of the present invention to provide a simple, efficient and economical exhaust gas treatment system in which exhaust gases are treated with a specially selected electric discharge to reduce harmful pollutants such as carbon monoxide, hydrocarbon and Nox emissions without producing significant back pressure in the exhaust system.

SUMMARY OF THE INVENTION

A method and apparatus are disclosed in which exhaust gases are passed through a treatment chamber and subjected to a relatively low-power alternating-current dielectric discharge for a selected time duration. The dielectric discharge, also known as a "silent discharge," is a capacitive discharge between electrodes, at least one of which is insulated. As a result, there can be no sparks or arcing between the electrodes. The discharge comprises the movement back and forth between electrodes of a cloud of electrons and ions that impact or slam into other molecules, dissociating those that are easiest to disrupt. Because of the fact that all nitrogen oxide gases have negative heats of formation, except at extremely high temperatures (1800° F. or above), these materials will be the easiest to dissociate.

A silent discharge is more efficient for ionizing gases than other forms of electrical discharge such as electric arcs, microwave or radio frequency plasmas. Moreover, a silent discharge is readily established essentially at any pressure from extremely low (less than one torr) to extremely high (many atmospheres). Accordingly, the placement of an appropriate array of alternately conductive and insulated electrodes in a gas stream will dissociate the nitrogen oxides in the stream. Additionally, the liberated monatomic oxygen will than oxidize any incompletely burned compounds in that stream.

In one embodiment of the invention, the dielectric discharge occurs between a first electrode encased in a dielectric and the chamber wall itself, which functions as a second electrode. In this manner, pollutants are oxidized and others are dissociated while the temperature of the exhaust gas is kept low enough to prevent the formation of new NOX pollutants. The addition of secondary air is not required with the invention disclosed herein.

The discharge voltage is adjusted so that the temperature of the exhaust gas when increased in temperature by the electrical discharge nevertheless remains in a temperature region in which the heat of formation of nitrogen oxides is negative. This prevents new nitrogen compounds from being created by the discharge. The length of the treatment chamber is selected so that the exhaust gas remains in the electric discharge for a length of time suitable to dissociate the nitrogen compounds and oxidize carbon monoxide and hydrocarbons in the gas. Tests have indicated that a significant overall reduction in pollutants occurs using the invention disclosed herein.

DETAILED DESCRIPTION OF THE INVENTION

Figure 1:
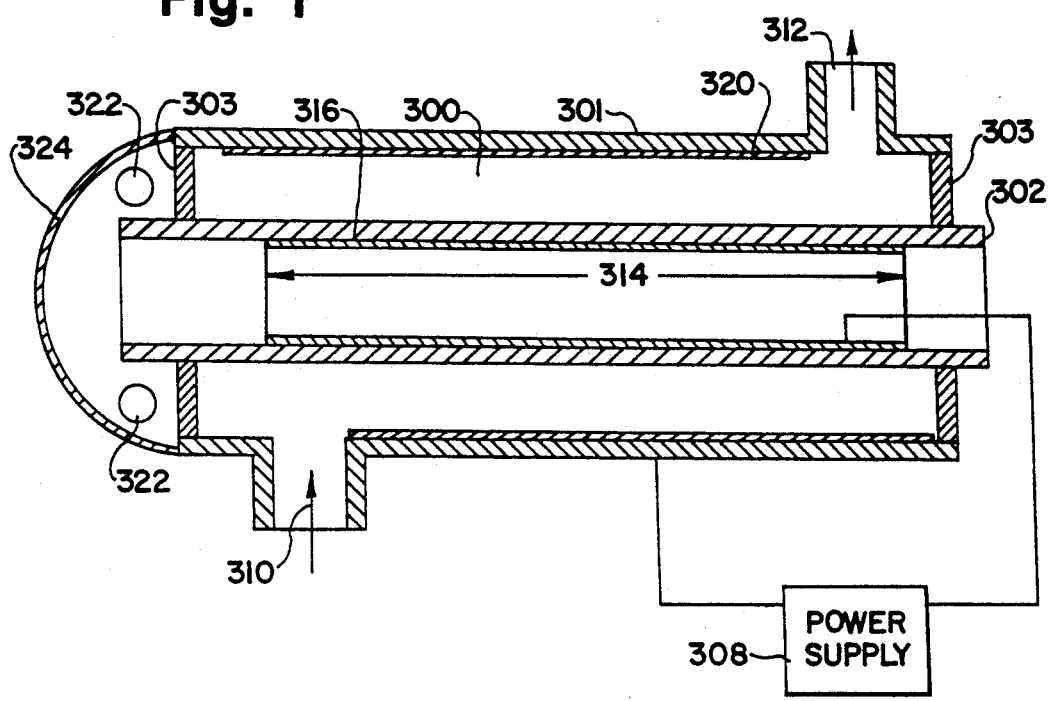
FIG. 1 shows an illustrative exhaust treatment chamber for applying a dielectric discharge to a fluid such as exhaust gas.

Referring to FIG. 1, one embodiment of the present invention is disclosed and described in which gaseous fluids such as exhaust gasses are treated by subjecting them to a dielectric discharge. Treatment chamber 300 is a closed chamber which, illustratively, is cylindrical but may have other cross-section. The longitudinal wall 301 of chamber 300 is made of a conductive material such as steel. The ends 303 may be of the same material as wall 301, or may be another material such as fused quartz. The fluid or gas to be treated enters chamber 300 via an inlet port 310 and exits via an outlet port 312. Ports 310 and 312 will typically be of the same material as wall 301, although this is not a requirement. The precise locations of the inlet and outlet ports are not critical to the invention, but for illustration are located towards the end of the chamber 300 so that the fluid or gas enters the chamber perpendicularly to the axis of the chamber. As shown, the cross-section of chamber 300 is constant throughout its entire length so that the chamber does not cause a significant back pressure on the gas passing through it. Such a chamber may illustratively be mounted in the exhaust pipe of an internal combustion engine or in the exhaust stack of a fossil fuel power plant. The chamber may also be mounted in a muffler system. The diameter of the chamber can be adjusted to accommodate the volume of gas passing through it.

Mounted within chamber 300, preferably along its central axis, in one embodiment, is a tubular insulator structure 302. In order for a dielectric discharge to occur and to prevent arcing, the insulator structure 302 should remain an insulator over the entire operating temperature range of treatment chamber 300 which, if the chamber is used to treat exhaust gas generated by an internal combustion engine, for example, may be in the range of 1200° F. Thus, the materials used to fabricate tubular structure 302 should not be of the type which are insulators at room temperature but which become conductive at higher temperatures. In particular, the bulk resistivity of the insulator structure 302 should remain greater than $10^9$ ohm-cm throughout the operating temperature range. Such materials as fused quartz and boron nitride have been found to be satisfactory for insulator 302.

To create an electric discharge within the chamber, two electrodes are necessary. One electrode is formed by the conductive chamber 300 itself. The second electrode 316 is formed on the inside surface of tubular structure 302. In one embodiment, for illustration, silver is deposited on the inside surface of structure 302. In another embodiment, a liquid electrode can be created by filling the tubular structure 302 with an electrically conductive acid solution such as sulfuric or acetic acid in water.

A high-voltage alternating current power supply 308 is connected between the chamber wall 300 and electrode 316. The voltage generated by power supply 308 is adjusted to initiate and maintain a dielectric discharge between electrode 316 and wall 300.

The electrical discharge will cause heating of the gas passing through it. In accordance with the invention, however, the temperature rise produced in the treated gas by the discharge is reduced so that the overall temperature of the gas will remain in the temperature region where the heat of formation of nitrogen oxides is negative. At temperatures above this region, nitrogen oxides (NOx) will increase. This is accomplished by subjecting the treated gas to a relatively low intensity discharge over a long time period rather than applying an intense discharge over a short time period as has been previously done. The active length 314 of chamber 300 and the frequency of high-voltage power supply 308 should be adjusted based on the flow velocity of the fluid through the chamber so that the fluid is subjected to a plurality of discharge cycles before completely passing through the chamber.

For example, above 1600° F., the heat of formation of polluting NOx compounds changes from negative to positive. Exhaust gas produced by an internal combustion engine varies in temperature up to approximately 1200° F. Thus the discharge produced by power supply 308 must be adjusted such that the temperature rise produced by the discharge increases the gas temperature by no more than 400° F.

Figure 2:
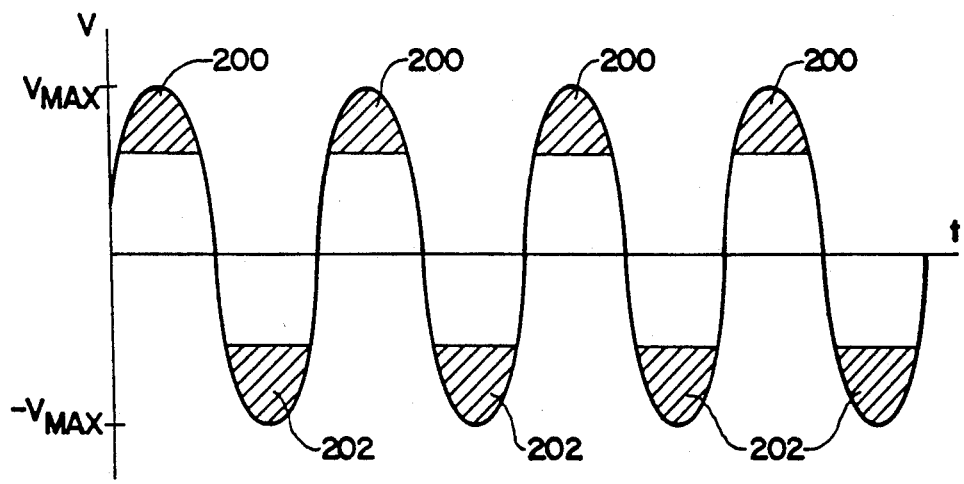
FIG. 2 shows an illustrative voltage waveform of the alternating current discharge voltage showing areas where the discharge occurs.

As shown in FIG. 2, the voltage output of the high-voltage alternating current power supply 308 generally has a sinusoidal voltage which varies between a positive maximum voltage, $v_{max}$ and a negative voltage, $-v_{max}$. The invention is not limited to sinusoidal waveforms and will operate with any alternating current waveform. Since an electrical discharge occurs only when the voltage difference between chamber 300 and insulator structure 302 rises above the ionization potential of the treated gas, a discharge will only occur in the shaded area 200 when the positive voltage difference exceeds the ionization potential, and in the shaded voltage area 202 when the negative voltage difference exceeds the ionization potential. Since the gas flows through chamber 300, the length 314 of chamber 300 and the frequency of power supply 308 must be adjusted based on the flow velocity in order to assure that the treated gas is subjected to a plurality of discharge cycles 200 and 202. Preferably, the length 314 of chamber 300 and the frequency of power supply 308 should be adjusted such that the treated gas is subjected to at least eight half-cycles 200 and 202 on its passage through chamber 300. Thus, because a typical exhaust gas flow velocity from an internal combustion engine can reach 200 feet/second, if the gas passes through a treatment chamber having an effective length of three feet, the treatment time is about 15 milliseconds. The frequency of the power supply should therefore be higher than that typically used in the past, at or above approximately 300 Hz, to assure proper gas treatment. In practice, the frequency of power supply 308 will be on the order of 400 Hz to 40,000 Hz.

Additional elements may be added to the disclosed device to further enhance its pollution reducing effectiveness. For instance, one electrode in the device may be coated with a catalyst to enhance its ability to reduce NOx emissions. In one illustrative example, the wall 301 of chamber 300 is made of steel and a catalyst plating 320, which preferably comprises rhodium but may comprise platinum or nickel, is applied to its inside surface. An alternative embodiment would be to make the walls 301 of chamber 300 of nickel, which itself is a catalyst. With such an arrangement, the catalyst would not cause the undue back pressure or pressure drop which current catalyst systems are known to create. In addition, a catalyst applied in this manner would not become poisoned because it would continuously be cleaned by the plasma.

In another pollution reducing enhancement, a high intensity ultraviolet light source, such as a circular source 322, can be located outside one or both ends of the chamber 300 so as to irradiate the gas as it flows through the chamber. When an ultraviolet light source 322 is used, the end 303 of chamber 300 should be a material transparent to ultraviolet light, such as fused quartz. A reflector 324 can also be added at the end of the chamber 300 to enhance the radiation placed into the chamber. Although not shown in FIG. 1, the ultraviolet light source can be placed at both ends of chamber 300 if desired. Ultraviolet light is known to reduce NOx emissions. In one test of the disclosed system using ultraviolet light, NOx emissions were reduced an additional twenty percent.

An exhaust gas treatment system has been constructed in accordance with the embodiment shown in FIG. 1. Treatment chamber 300 was a cylindrical steel tube which had an overall length of four feet and an effective length 314 of three feet and a diameter of five inches. Structure 302 had a diameter of 3.5 inches and was constructed of fused quartz. Inlet and outlet pipes 310 and 312 were 3.5 inches in diameter. Power supply 308 was adjusted to produce a 3300 Hz alternating current output with an output voltage of 60 kilovolts. The voltage of power supply 308 was adjusted such that the temperature of the exhaust gas, including the increase due to the discharge, remained below 1600° F. and the power applied was approximately 60 watts.

An experimental model of the exhaust gas treatment system was connected to receive exhaust from one cylinder of an L-10 diesel engine manufactured by the Cummins Engine Company, Columbus, Ind. Table I below shows the hydrocarbon and NOx emissions as measured by the Cummins Technical Center at Columbus, Ind. at the output 312 of the treatment system without high-voltage supply 308 operating.

TABLE I

| Hydrocarbons | 205 ppm. |
|---|---|
| NOx | 597 |
| RPM | 732 |

Table II shows a 46% reduction in hydrocarbon and a 38% reduction in NOx emissions when power supply 308 was operative, causing the exhaust gas treatment system to be operative.

TABLE II

| Hydrocarbons | 113 ppm. |
|---|---|
| NOx | 369 |
| RPM | 732 |

Although an embodiment of the invention has been illustrated and described, it is anticipated that various changes and modifications, including, without limitation, multiple electrodes, will be apparent to those skilled in the art, and that such changes may be made without departing from the scope of the invention as defined by the following claims:

What is claimed is:

1. A method for reducing pollutants including NOx compounds in a moving fluid produced by a combustion source, said method comprising the steps of:
   providing a closed treatment chamber having a length and an input and output and a substantially open interior portion for flow of said moving fluid and comprised of a conductive material sufficient to make said treatment chamber a first electrode;
   providing a dielectric insulating element within said treatment chamber;
   placing within said dielectric insulating element conductive material sufficient to create a second electrode;
   generating an alternating current electric field between said first and second electrodes in the interior portion of said treatment chamber;
   directing said moving fluid through the interior portion of said treatment chamber and said electric field; and
   adjusting the frequency and strength of said electric field so that a dielectric discharge occurs while said field strength remains low enough that the temperature of said moving fluid remains in a temperature range of lower than about 1800° F. where the heat of formation of said NOx compounds is negative.

2. The method according to claim 1, further including the step of:
   adjusting said treatment chamber length and said alternating currency frequency such that said moving fluid is subjected to at least eight half-cycles of said discharge while in said treatment chamber.

3. A method for reducing pollutants, including NOx compounds, in a moving fluid produced by a combustion source in a closed treatment chamber having a length and a substantially open interior portion for flow of said fluid and at least one pair of electrodes separated by an insulator, said method comprising the steps of:
   directing said fluid through the interior portion of said chamber;
   applying an alternating current electrical field across said electrodes to cause a dielectric discharge to occur between said electrodes and in the interior portion of said chamber, said field having a frequency and a strength low enough that the temperature of said fluid remains in a temperature range of lower than about 1800° F. where the heat of formation of said NOx compounds is negative; and
   adjusting said treatment chamber length and said alternating current frequency such that said fluid is subjected to at least eight half-cycles of said discharge while in said treatment chamber.

4. The method according to claim 3, wherein said first electrode comprises said treatment chamber, and said second electrode comprises a electrical conductor located inside a dielectric insulator placed within said treatment chamber.

5. The method according to claim 4, wherein a portion of the inside of said treatment chamber comprises a catalyst.

6. The method according to claim 4, further including an ultraviolet light source positioned such that said moving fluid passes through the light emitted from said light source.

7. The method according to claim 3, further including an ultraviolet light source positioned such that said moving fluid passes through the light emitted from said light source.

8. Apparatus for reducing pollutants, including NOx compounds, in a moving fluid produced by a combustion source, said apparatus comprising:
  a treatment chamber having an inlet and an outlet and a substantially open interior portion through which said moving fluid passes and comprised of a conductive material sufficient to form a first electrode;
  a tubular element within said treatment chamber positioned such that said moving fluid passes between said tubular element and said first electrode, said tubular element comprising a dielectric insulating material and having a conductive material located within said tubular element to form a second electrode;
  means for generating an alternating current electrical field between said first and second electrodes in the interior portion of said treatment chamber, the electrical field having a strength high enough that a dielectric discharge occurs between said electrodes, and low enough that the temperature of said moving fluid remains in a temperature range of lower than about 1800° F. where the heat of formation of said NOx compounds is negative.

9. Apparatus according to claim 8, wherein a portion of said treatment chamber comprises a catalyst.

10. Apparatus according to claim 8, further including an ultraviolet light source positioned such that said moving fluid passes through the light emitted from said light source.

11. Apparatus according to claim 9, further including an ultraviolet light source positioned such that said moving fluid passes through the light emitted from said light source.

12. Apparatus according to claim 8, wherein said treatment chamber is cylindrical and said fluid passes longitudinally through said chamber.

13. Apparatus according to claim 12, wherein said insulating material comprises fused quartz or boron nitride.

14. Apparatus according to claim 13, wherein said treatment chamber is of a length and said electric field has a frequency such that said moving fluid is subjected to at least eight half-cycles of electric discharge while in said treatment chamber.

15. Apparatus for reducing pollutants, including NOx compounds, in a moving fluid produced by a combustion source, said apparatus comprising:
  a cylindrical treatment chamber comprised of an electrically conductive material sufficient to form a first electrode, said chamber having an inlet and an outlet and a substantially open interior portion for flow of said fluid and an axis;
  a tubular insulator structure located in said chamber along said chamber axis and passing through said chamber;
  a second electrode located on the inside of said tubular insulator structure;
  a power supply for generating an alternating current voltage; and
  means for applying said electrical voltage to said first and second electrodes to create an electric field within the interior portion of said chamber, said field having a strength sufficient that a dielectric discharge occurs between said first and second electrodes, but said field strength being low enough that the temperature of said fluid remains in a temperature range of lower than about 1800° F. where the heat of formation of said NOx compounds is negative.

16. Apparatus according to claim 15, wherein a portion of said treatment chamber comprises a catalyst.

17. Apparatus according to claim 16, further including an ultraviolet light source positioned such that said moving fluid passes through the light emitted from said light source.

18. Apparatus according to claim 17, further including an ultraviolet light source positioned such that said moving fluid passes through the light emitted from said light source.

19. Apparatus for treating pollutants in a moving fluid according to claim 17 wherein said insulator structure comprises fused quartz or boron nitride.

20. A method for reducing pollutants including NOx in a gas produced by a combustion source comprising the steps of:
  flowing the gas through a substantially open treatment zone defined by first and second electrodes, the first electrode being covered by an insulator;
  generating a cyclically varying electric field between the first and second electrodes so as to subject the gas to a plurality of cycles of the varying electric field, the varying electric field having a strength high enough to create a dielectric discharge between the first and second electrodes and low enough that the temperature of the gas remains in a temperature range of lower than about 1800° F. in which the heat of formation of NOx is negative.

21. The method of claim 20 wherein the cyclically varying electric field is sinusoidal.

22. The method of claim 20 wherein the cyclically varying electric field is of a frequency at or above approximately 300 hertz.

23. The method of claim 21 wherein the cyclically varying electric field is of a frequency at or above approximately 300 hertz.

24. The method of claim 20 further comprising the step of subjecting the gas to ultraviolet radiation as the gas flows through the treatment zone.

25. The method of claim 24 wherein the ultraviolet radiation is directed towards an ultraviolet radiation reflective surface.

26. The method of claim 20 wherein the second electrode includes a catalytic surface.

27. The method of claim 26 wherein the catalytic surface comprises rhodium, platinum or nickel.

28. A method for reducing pollutants including NOx in the exhaust gas of a diesel engine comprising the steps of:
  flowing the exhaust gas through a substantially open treatment zone defined by first and second electrodes, the first electrode being covered by an insulator;
  generating a cyclically varying electric field between the first and second electrodes so as to subject the exhaust gas to a plurality of cycles of the varying electric field, the varying electric field having a strength high enough to create a dielectric discharge between the first and second electrodes and low enough that the temperature of the exhaust gas remains in a temperature range of lower than about 1800° F. in which the heat of formation of NOx is negative.

29. The method of claim 28 wherein the cyclically varying electric field is sinusoidal.

30. The method of claim 28 wherein the cyclically varying electric field is of a frequency at or above approximately 300 hertz.

31. The method of claim 29 wherein the cyclically varying electric field is of a frequency at or above approximately 300 hertz.

32. The method of claim 28 further comprising the step of subjecting the exhaust gas to ultraviolet radiation as the gas flows through the treatment zone.

33. The method of claim 32 wherein the ultraviolet radiation is directed towards an ultraviolet radiation reflective surface.

34. The method of claim 28 wherein the second electrode includes a catalytic surface.

35. The method of claim 34 wherein the catalytic surface comprises rhodium, platinum or nickel.

36. A method for reducing pollutants including NOx compounds in a moving fluid produced by a combustion source, said method comprising the steps of:
providing a closed treatment chamber having a length and an input and output and a substantially open interior portion for flow of said moving fluid and comprised of a conductive material sufficient to make said treatment chamber a first electrode;
providing a dielectric insulating element within said treatment chamber;
placing within said dielectric insulating element conductive material sufficient to create a second electrode;
generating an alternating current electric field between said first and second electrodes in the interior portion of said treatment chamber;
directing said moving fluid through the interior portion of said treatment chamber and electric field, wherein the residence of the fluid in the treatment chamber is on the order of 15 milliseconds; and
adjusting the frequency and strength of said electric field so that a dielectric discharge occurs while said field strength remains low enough that the temperature of said moving fluid remains in a temperature range of lower than about 1800° F. where the heat of formation of said NOx compounds is negative.

37. The method according to claim 36, further including the step of:
adjusting said treatment chamber length and said alternating currency frequency such that said moving fluid is subjected to at least eight half-cycles of said discharge while in said treatment chamber.

38. A method for reducing pollutants, including NOx compounds, in a moving fluid produced by a combustion source in a closed treatment chamber having a length and a substantially open interior portion for flow of said fluid and at least one pair of electrodes separated by an insulator, said method comprising the steps of:
directing said fluid through the interior portion of said chamber;
applying an alternating current electrical field across said electrode to cause a dielectric discharge to occur between said electrodes and in the interior portion of said chamber, said field having a frequency and a strength low enough that the temperature of said fluid remains in a temperature range of lower than about 1800° F. where the heat of formation of said NOx compounds is negative; and
adjusting said treatment chamber length and said alternating current frequency such that said fluid is subjected to at least eight half-cycles of said discharge while in said treatment chamber, wherein the residence of the fluid in the treatment chamber is on the order of 15 milliseconds.

39. The method according to claim 38, wherein said first electrode comprises said treatment chamber, and said second electrode comprises a electrical conductor located inside a dielectric insulator placed within said treatment chamber.

40. The method according to claim 39, wherein a portion of the inside of said treatment chamber comprises a catalyst.

41. The method according to claim 39, further including an ultraviolet light source positioned such that said moving fluid passes through the light emitted from said light source.

42. The method according to claim 38, further including an ultraviolet light source positioned such that said moving fluid passes through the light emitted from said light source.

43. Apparatus for reducing pollutants, including NOx compounds in a moving fluid produced by a combustion source, said apparatus comprising:
a treatment chamber having an inlet and an outlet and a substantially open interior portion through which said moving fluid passes and comprised of a conductive material sufficient to form a first electrode;
a tubular element within said treatment chamber positioned such that said moving fluid passes between said tubular element and said first electrode, said tubular element comprising a dielectric insulating material and having a conductive material located within said tubular element to form a second electrode;
means for generating an alternating current electrical field between said first and second electrodes in the interior portion of said treatment chamber, the electrical field having a strength high enough that a dielectric discharge occurs between said electrodes, and low enough that the temperature of said moving fluid remains in a temperature range of lower that about 1800° F. where the heat of formation of said NOx compounds is negative;
wherein the residence of the fluid in the treatment chamber is on the order of 15 milliseconds.

44. Apparatus according to claim 43, wherein a portion of said treatment chamber comprises a catalyst.

45. Apparatus according to claim 44, further including an ultraviolet light source positioned such that said moving fluid passes through the light emitted from said light source.

46. Apparatus according to claim 43, further including an ultraviolet light source positioned such that said moving fluid passes through the light emitted from said light source.

47. Apparatus according to claim 43, wherein said treatment chamber is cylindrical and said fluid passes longitudinally through said chamber.

48. Apparatus according to claim 47, wherein said insulating material comprises fused quartz or born nitride.

49. Apparatus according to claim 48, wherein said treatment chamber is of a length and said electric field has a frequency such that said moving fluid is subjected to at least eight half-cycles of electric discharge while in said treatment chamber.

50. Apparatus for reducing pollutants, including NOx compounds, in a moving fluid produced by a combustion source, said apparatus comprising:

a cylindrical treatment chamber comprised of an electrically conductive material sufficient to form a first electrode, said chamber having an inlet and an outlet and a substantially open interior portion for flow of said fluid and an axis;

a tubular insulator structure located in said chamber along said chamber axis and passing through said chamber;

a second electrode located on the inside of said tubular insulator structure;

a power supply for generating an alternating current voltage; and means for applying said electrical voltage to said first and second electrodes to create an electric field within the interior portion of said chamber, said field having a strength sufficient that a dielectric discharge occurs between said first and second electrodes, but said field strength being low enough that the temperature of said fluid remains in a temperature range of lower than about 1800° F. where the heat of formation of said NOx compounds is negative;

wherein the residence of the fluid in the treatment chamber is on the order of 15 milliseconds.

51. Apparatus according to claim 50, wherein a portion of said treatment chamber comprises a catalyst.

52. Apparatus according to claim 51, further including an ultraviolet light source positioned such that said moving fluid passes through the light emitted from said light source.

53. Apparatus according to claim 52, further including an ultraviolet light source positioned such that said moving fluid passes through the light emitted from said light source.

54. Apparatus for treating pollutants in a moving fluid according to claim 52 wherein said insulator structure comprises fused quartz or boron nitride.

55. A method for reducing pollutants including NOx in a gas produced by a combustion source comprising the steps of:

flowing the gas through a substantially open treatment zone defined by first and second electrodes, the first electrode being covered by an insulator;

generating a cyclically varying electric field between the first and second electrodes so as to subject the gas to a plurality of cycles of the varying electric field, the varying electric field having a strength high enough to create a dielectric discharge between the first and second electrodes and low enough that the temperature of the gas remains in a temperature range of lower than about 1800° F. in which the heat of formation of NOx is negative, wherein the residence of the fluid in the treatment chamber is on the order of 15 milliseconds.

56. The method of claim 55 wherein the cyclically varying electric field is sinusoidal.

57. The method of claim 55 wherein the cyclically varying electric field is of a frequency at or above approximately 300 hertz.

58. The method of claim 56 wherein the cyclically varying electric field is of a frequency at or above approximately 300 hertz.

59. The method of claim 55 further comprising the step of subjecting the gas to ultraviolet radiation as the gas flows through the treatment zone.

60. The method of claim 59 wherein the ultraviolet radiation is directed towards an ultraviolet radiation reflective surface.

61. The method of claim 55 wherein the second electrode includes a catalytic surface.

62. The method of claim 61 wherein the catalytic surface comprises rhodium, platinum or nickel.

63. A method for reducing pollutants including NOx in the exhaust gas of a diesel engine comprising the steps of:

flowing the exhaust gas through a substantially open treatment zone defined by first and second electrodes, the first electrode being covered by an insulator;

generating a cyclically varying electric field between the first and second electrodes so as to subject the exhaust gas to a plurality of cycles of the varying electric field, the varying electric field having a strength high enough to create a dielectric discharge between the first and second electrodes and low enough that the temperature of the exhaust gas remains in a temperature range of lower than about 1800° F. in which the heat of formation of NOx is negative;

wherein the residence of the fluid in the treatment chamber is on the order of 15 milliseconds.

64. The method of claim 63 wherein the cyclically varying electric field is sinusoidal.

65. The method of claim 63 wherein the cyclically varying electric field is of a frequency at or above approximately 300 hertz.

66. The method of claim 64 wherein the cyclically varying electric field is of a frequency at or above approximately 300 hertz.

67. The method of claim 63 further comprising the step of subjecting the exhaust gas to ultraviolet radiation as the gas flows through the treatment zone.

68. The method of claim 67 wherein the ultraviolet radiation is directed towards an ultraviolet radiation reflective surface.

69. The method of claim 63 wherein the second electrode includes a catalytic surface.

70. The method of claim 69 wherein the catalytic surface comprises rhodium, platinum or nickel.

* * * * *